C. J. OHLSSON.
GRIP TREAD FOR VEHICLE TIRES.
APPLICATION FILED SEPT. 21, 1910.
1,080,923.
Patented Dec. 9, 1913.
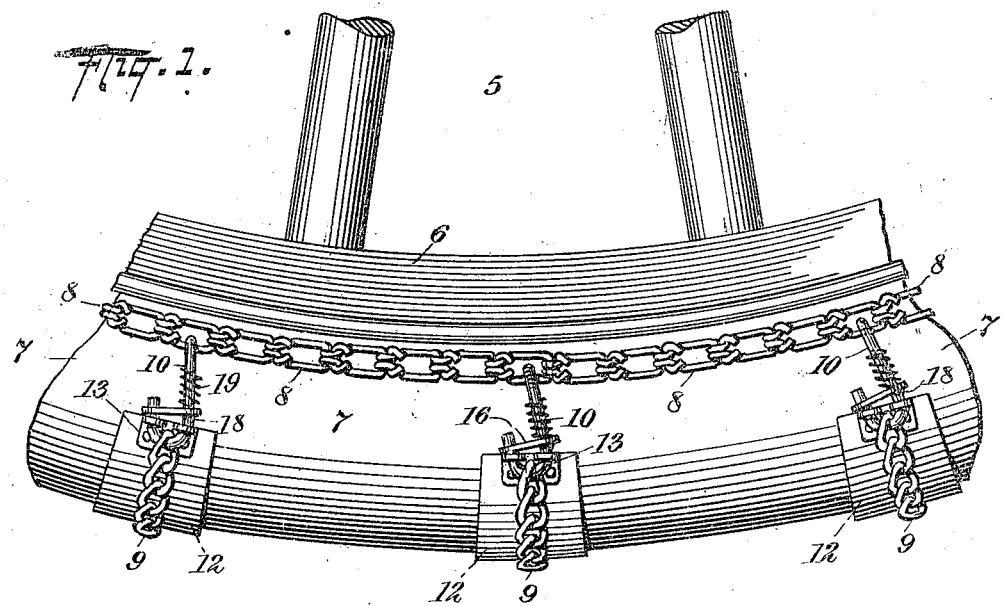
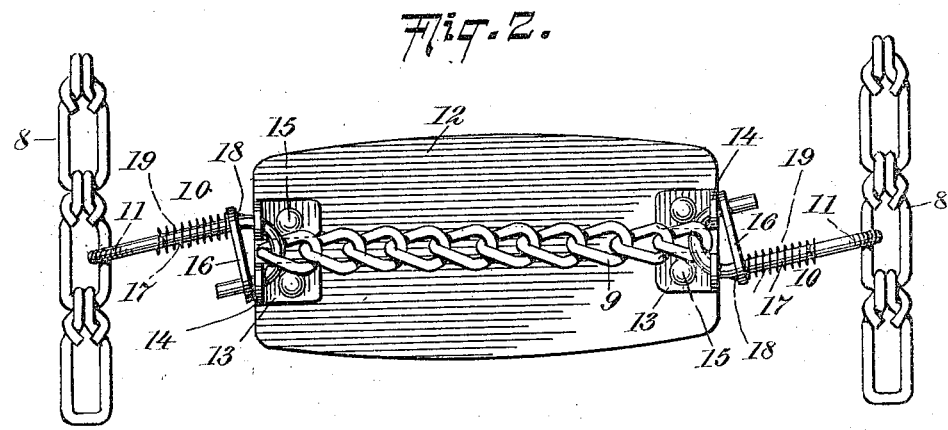
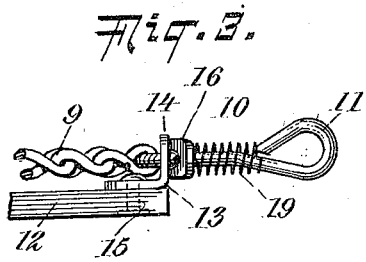
WITNESSES:
INVENTOR
CHARLES J. OHLSSON
BY
his ATTORNEY

UNITED STATES PATENT OFFICE.

CHARLES J. OHLSSON, OF NEW YORK, N. Y.

GRIP-TREAD FOR VEHICLE-TIRES.

1,080,923.

Specification of Letters Patent.

Patented Dec. 9, 1913.

Application filed September 21, 1910. Serial No. 582,993.

*To all whom it may concern:*

Be it known that I, CHARLES J. OHLSSON, of the city of New York, borough of Brooklyn, Kings county, in the State of New York, have invented certain new and useful Improvements in Grip-Treads for Vehicle-Tires, of which the following is a full, clear, and exact specification.

My invention relates to improvements in means for increasing the tractive properties of vehicle wheels, and the same has for its object more particularly to provide a grip tread which may be easily applied to or removed from a vehicle wheel.

Further, said invention has for its object to provide a grip tread, provided with means for protecting the tread portion of the tire against injury by the gripping member of the device.

Further, said invention has for its object to provide a grip tread comprising a series of gripping members which may be readily removed or disconnected from the attaching members when it is desired to replace one which has become broken or worn out in consequence of use.

Further, said invention has for its object to provide a grip tread with means for securing the gripping member and the protecting member therefor jointly together and to the attaching members in such a way that the gripping members will not become accidentally detached from the means for securing the same to the attaching members.

To the attainment of the aforesaid objects and ends my invention consists in the novel details of construction and in the combination, connection and arrangement of parts hereinafter more fully described, and then pointed out in the claims.

In the accompanying drawings forming part of this specification, wherein like numerals of reference indicate like parts, Figure 1 is a side view showing a portion of a vehicle wheel and tire with a grip tread, constructed according to and embodying my said invention, applied thereto; Fig. 2 is an enlarged face view showing portions of the side chains, and one of the gripping members with its protecting means secured thereto, and Fig. 3 is an enlarged detail side view showing one end of the gripping member, the protecting member, and the means for securing the same together.

In said drawings 5 designates a vehicle wheel of usual construction, 6 the rim thereof, and 7 a pneumatic tire secured upon the outer side of the rim.

The gripping tread comprises a pair of parallel attaching members or side chains 8, 8 which are provided at their ends with suitable means for securing the same together. The said chains 8, 8 are of such length that when arranged in position upon the wheel, and their respective ends secured together, they will form circular members of smaller diameter than the outer diameter of the tire. Between the said chains 8, 8 are arranged, at suitable intervals, a plurality of gripping members or short chains 9, 9 which are secured at the opposite ends to said side chains by means of hooks 10, 10. The outer ends of said hooks are provided with eyes 11, 11 which are secured to the side chains 8, 8, and the inner or hook ends of said hooks engaged with the opposite ends of the gripping members or short chains 9, 9.

12, 12 denote protecting sections having slightly curved longitudinal sides and provided at their ends with coupling devices formed of a plurality of lugs 13, 13 comprising a vertical member 14 having an aperture therein, and a horizontal member 15 secured upon the outer surface of the protecting section 12 by means of a rivet 15. The lugs 13, 13 are adapted to receive the ends of the hooks 10, and maintain the opposite ends of the short chains 9, 9 in position thereon intermediate the vertical portions 14, 14 of the lugs 13, 13. Each hook 10 is provided with a keeper in the form of a flat plate 16 which is slidably disposed upon the body portion 17 of the hook 10, and has its free end provided with an aperture adapted to receive the end of the hook 10.

18 denotes a stop provided upon the hook 10 below the plate 16 in order to limit the movement of said plate, and 19 denotes a spring disposed upon the hook 10 intermediate the eye 11 thereof and the outer surface of the plate 16, whereby to hold said plate normally in position upon and engaging the free end of the hook 10.

It will be noted that when the grip tread is secured in position upon a wheel the said chains 8, 8 serve to maintain the transverse chains 9, 9, and their protecting sections 12, 12 under tension upon the tire, and at the same time the free ends of the hook members 10, 10 are prevented from opening under the tension of the chains 9, 9 by means of the keepers 16 which serve to prevent the free ends of the hooks being drawn apart, and thereby release the opposite ends of the short chains 9, 9. Further, it will be noted that by reason of the improved construction, the said short chains 9, 9 are prevented from becoming disengaged from the hooks 10 by reason of the fact that the portions of said hooks to each side of the ends of the short chains 9, 9 are maintained within the vertical portions 14, 14 of the lugs 13, 13 secured at the opposite ends of the protecting sections 12, 12, and thus serve effectually to keep the parts in proper position upon the tire.

In order to replace a short chain 9, which may become broken or worn out in consequence of use, it merely becomes necessary to first release the free end of the keeper or plate 16 by turning the same outwardly against the tension of the spring 19, and then pushing the hook member in until the free end of the hook member becomes disengaged from the lug 13, through which it extends. The hook 10 is then given a partial turn whereupon the end of the short chain 9 may be removed therefrom and a new one inserted, and the parts again secured together, as hereinabove described.

In this application I do not claim the construction of the hook member 10, as the same forms the subject-matter of a separate application filed by me on December 22, 1910, Serial Number 578,774.

Having thus described my invention, what I claim and desire to secure by Letters Patent, is:—

1. A grip-tread for vehicle tires comprising a pair of annular attaching members, a plurality of transverse gripping members intermediate the same, flexible protecting members for said gripping members, lugs arranged at the opposite ends of said protecting members, hook members permanently secured to said attaching members and detachably engaging said lugs and the ends of said gripping members, and means for closing the opening of said hook members, substantially as specified.

2. A grip tread for vehicles comprising a pair of annular attaching members, a plurality of transverse gripping members intermediate the same, flexible protecting members for said gripping members, a pair of angle plates having apertures therein, and secured to the opposite ends of said protecting members, and hook members secured at their outer ends to said annular attaching members, and having their inner ends engaging the apertures in said angle plates and the ends of said gripping members, substantially as specified.

3. A grip tread for vehicles comprising a pair of annular attaching members, a plurality of transverse gripping members intermediate the same, flexible protecting members for said gripping members, a pair of angle plates having apertures therein, and secured to the opposite ends of said protecting members, hook members secured at their outer ends to said annular attaching members, and having their inner ends engaging the apertures in said angle plates and the ends of said gripping members, and means for closing the opening of said hook members, substantially as specified.

Signed at the city of New York, in the county and State of New York, the fifteenth day of September, one thousand nine hundred and ten.

CHARLES J. OHLSSON.

Witnesses:
CONRAD A. DIETERICH,
JOSEPH G. QUINN, Jr.

Copies of this patent may be obtained for five cents each, by addressing the Commissioner of Patents, Washington, D. C."